(12) United States Patent
Chao-Li et al.

(10) Patent No.: US 6,785,754 B1
(45) Date of Patent: Aug. 31, 2004

(54) INTEGRATE SERIAL PORT PLUG AND PLAY INTO SIMPLE SIGNALING COMMUNICATION TYPE UPS

(75) Inventors: Kao Chao-Li, Yunlin (TW); Lee Sheng-Ta, Chia-I (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/464,992

(22) Filed: Jun. 18, 2003

(51) Int. Cl.[7] .......................... G06F 13/42; G06F 13/10
(52) U.S. Cl. ........................... 710/105; 710/15; 710/16; 710/104; 307/66
(58) Field of Search ..................... 307/64, 66; 713/300; 710/15–19, 62, 100, 104, 105, 106, 110

(56) References Cited

U.S. PATENT DOCUMENTS

| | | | |
|---|---|---|---|
| 5,233,350 A | * | 8/1993 | Khim .......................... 341/144 |
| 5,935,224 A | * | 8/1999 | Svancarek et al. ............. 710/63 |
| 6,445,088 B1 | * | 9/2002 | Spitaels et al. ................ 307/66 |
| 6,691,248 B1 | * | 2/2004 | Nishijima et al. ............. 714/14 |
| 6,734,809 B1 | * | 5/2004 | Olodort et al. ................ 341/22 |
| 2003/0133263 A1 | * | 7/2003 | Shu ............................. 361/685 |

* cited by examiner

*Primary Examiner*—Ilwoo Park
(74) *Attorney, Agent, or Firm*—Perkins Coie LLP

(57) ABSTRACT

In the present invention, a DSR of the serial port is coupled to a DTR of the serial port for responding to a detecting signal from a host computer. A RTS signal of the serial port is at a high level when a system is waiting for a PnP ID information from a PnP device during an enumeration process. The UPS detects that RTS is at high level to determine a time point of delivering the PnP ID information. Hence, the function of serial port plug and play can be integrated into simple signaling communication type UPS.

20 Claims, 2 Drawing Sheets

US 6,785,754 B1

INTEGRATE SERIAL PORT PLUG AND PLAY INTO SIMPLE SIGNALING COMMUNICATION TYPE UPS

BACKGROUND OF THE INVENTION

1. Field of the Invention

This invention relates to a communication type UPS, and more particularly to a simple signaling communication type UPS.

2. Description of the Prior Art

A hardware damage, a system shutdown, a data loss, etc are frequently occurred in an electric equipment due to an unstable power. Therefore, the UPS (Uninterruptible Power System) becomes a standard equipment of precise apparatuses, such as a personal computer.

The UPS comprising a battery connects between an electric power and an electric equipment, and when the electric power is normal, the UPS charges the battery and provides a stable voltage to the electric equipment. When the electric power is abnormal, the UPS transforms the power of the battery into an alternating current power for providing the electric equipment with an uninterruptible electric power. According to different system designs, the UPS are classified as on-line, off-line and line interactive. A backup time of the UPS depends on a VA value of the UPS. The VA value is bigger and so the backup time is longer, but the backup time also depends on a power consumption of the electric equipment. Hence, the backup time of the UPS is determined according to a using condition of a user.

An abnormal electric power does not only mean that a power cut, it comprises problems of the power cut, a sags, a swell, spikes, surges, noises, transients and so on. These problems easily cause damages of a computer or a precise electric software/hardware, such as equipment shutdown, internal component breakdown, shorter life, and data loss. When the problems occur and cause power quality to downgrade, the UPS will automatically steadies the voltage and filters noises for providing a clear and stable electric power.

The UPS does not only simply supplies an uninterruptible electric power. Even the UPS is employed, the danger of power cut is still existent if the electric power does not yet covers from the power cut. Therefore, users must take some measures, such as saving data, during the backup time. The UPS can provide a buffer time to make users save data, or if users are not on the side of the electric equipment, the UPS can provide functions of a remote control, automatically saving data or automatically shutdown. These intelligent functions comprise sounding warning signal, delivering an email, and internet network remote control, and communicate with a computer through communication port by a software provided by the UPS.

In general, the UPS can transmits control signals to a computer through a communication port. The types of the communication ports comprise dry-contact, RS-232 serial port, SNMP (simple network management power), AS400, USB (universal serial bus) and so on. The AS400 is specially designed for IBM computers. The SMNP can provide a function that the UPS can directly connect to network without a computer.

The dry-contact, RS-232 serial port and USB are the most common communication ports. A software that obtains signals from the UPS through these communication ports comprises functions of monitoring a state of electric power, the battery being under low voltage, automatically saving data, automatically shutdown the system, etc for making users know the state of the UPS. The simplest communicating method is the simple signaling that is through the serial port with dry-contact. However, the simple signaling only represents two states or signals, such as Hi and Lo, as shown in FIG. 1A and FIG. 1B. At present, simple signaling communication type UPS does not yet use asynchronous serial data transmission to transmit data and so can not transmit COM Plug and Play (COM PnP) ID to a computer.

SUMMARY OF THE INVENTION

In those conventional arts, the PnP ID can not be transmitted to a computer through a serial port with a simple signaling of dry-contact. One of objectives of the present invention is to integrate serial port plug and play into simple signaling communication type UPS.

Another objective of present invention is to employ GPIO (general purpose input/output) to simulate the asynchronous serial data transmission of the RS-232 serial port for transmitting a PnP ID to a computer.

Another objective of present invention is to provide a PnP ID function for supporting the operating system to identify new device and guiding users to install a suitable driver or application software.

As aforementioned, the present invention provides a simple signaling communication type UPS having serial port PnP function. The UPS comprises an UPS means, a transferring means, and a serial port. The UPS means comprises a micro controller. The transferring means transfers a voltage level of a first micro controller signal into a voltage level of a first serial port signal and transfers a voltage level of a second serial port signal into a voltage level of a second micro controller signal. The serial port comprises a DTR pin, a DSR pin, and a RTS pin, wherein the DSR pin is coupling to the DTR pin to generate a response signal for responding a detecting signal of the DTR pin. Wherein, during a PnP enumeration process, the micro controller transmits a PnP ID information after a voltage level of the RTS pin is transferred from a negative signal level to a positive signal level. The positive signal level of RTS or DTR is as a trigger signal, the micro controller receives the trigger signal and then generates a PnP ID information.

Hence, compared with that in the conventional arts, the PnP ID can not be transmitted to a computer through a serial port with a simple signaling of dry-contact. The present invention integrates serial port plug and play into simple signaling communication type UPS, and simulates the asynchronous serial data transmission of the RS-232 serial port for transmitting a PnP ID to a computer.

Therefore, the operating system can identify the UPS and guide users to install a suitable driver or application software.

BRIEF DESCRIPTION OF THE DRAWINGS

The foregoing aspects and many of the attendant advantages of this invention will become more readily appreciated as the same becomes better understand by reference to the following detailed description, when taken in conjunction with the accompanying drawings, where in.

DESCRIPTION OF THE PREFERRED EMBODIMENT

Some sample embodiments of the invention will now be described in greater detail. Nevertheless, it should be recognized that the present invention can be practiced in a wide range of other embodiments besides those explicitly described, and the scope of the present invention is expressly not limited expect as specified in the accompanying claims.

Then, the components of the different elements are not shown to scale. Some dimensions of the related components are exaggerated and meaningless portions are not drawn to provide a more clear description and comprehension of the present invention.

One preferred embodiment of the present invention employs a DB9 communication port and arranges the arrangement of pins of the DB9 communication port (in general, serial port) to achieve the purpose that the simple signaling communication type UPS can transmits the PnP ID to a computer. Therefore, the computer can identify the UPS and guide users to install a suitable driver or application software. Table. 1 is the arrangement of the DB9 port in the present invention for integrating serial port plug and play into simple signaling.

TABLE 1

| | | Pins of DB9 | |
|---|---|---|---|
| Name | Computer DB9 Connector | Definition on UPS | Signaling Direction |
| COM | Pin 5 | Signal Common (Ground) | |
| TXD | Pin 3 | Set low (as reference negative power for RS-232 serial interface | Computer to UPS |
| RXD | Pin 2 | PnP ID string | UPS to computer |
| RTS | Pin 7 | Set high (as reference positive power for RS-232 serial interface | Computer to UPS |
| CTS | Pin 8 | AC fail | UPS to computer |
| DSR | Pin 6 | Couple to pin 4 DTR | UPS to computer |
| DTR | Pin 4 | On battery remote shutdown | Computer to UPS |
| CD | Pin 1 | Battery low | UPS to computer |
| RI | Pin 9 | No connected | |

Figure 1A:
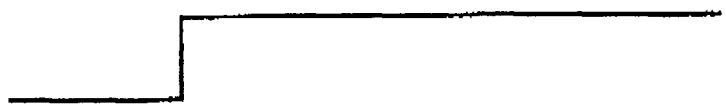
FIGS. 1A and 1B are schematic diagrams of a state or a signal represented by simple signaling.
Figure 1B:
Figure 2:
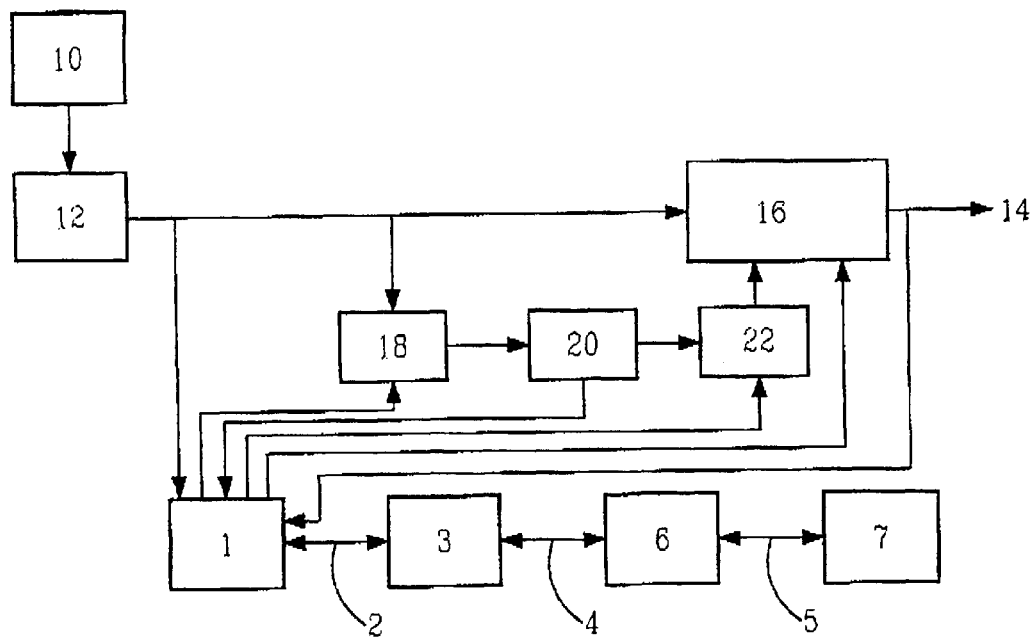
FIG. 2 is a block diagram of one preferred embodiment in the present invention.

FIG. 2 is a block diagram of the preferred embodiment in the present invention. The input AC power 10 passes through the filter or surge protector 12 to the power failure switch 16, the battery charger 18, and the micro controller 1. The micro controller 1 detects the input AC power 10 that is filtered by the filter or surge protector 12 and then lessened. The battery charger 18 transforms the AC voltage into DC voltage for charging the battery 20. The inverter 22 transforms DC voltage from the battery 20 into AC voltage to the power failure switch 16. The micro controller 1 detects the input AC power 10 through the filter or surge protector 12, the battery 20, and the UPS output signal 14, and then determines which state of the UPS is in accordance with the detecting signals. When the input AC power is abnormal or a power cut is happened, the micro controller 1 transmits a control signal to the inverter 22 and then the inverter 22 transforms DC voltage into AC voltage to the power failure switch 16. The power failure switch 16 switches the output power to the electric power from the inverter 22. The micro controller 1 detects the voltage of the battery 20 as a remaining battery capacity calculation of the battery 20. The micro controller 1 continuously transmits state signals of the UPS 2 to the signal voltage level transfer 3 for transferring the signals 2 into the serial port signals 4. The serial port signals 4 are transmitted from the signal voltage level transfer 3 to the communication port 6. The serial port signals 5 are transmitted from the communication port 6 to the host computer 7. Hence, users can know which state of the UPS is.

The UPS can provide the reference positive and the reference negative power source of the serial port interface. In addition, due to TXD being at negative signal level during the enumeration process, TXD can be as the reference negative power source of the serial port interface. RTS is at positive signal level during the time of waiting for PnP ID and so RTS can be as the reference positive power source of the serial port interface during the time. Moreover, during the UPS monitoring process, application software sets TXD at negative signal level and RTS at positive signal level. Hence, during the monitoring process, the serial port interface of the signal voltage level transfer 3 has the reference positive and the reference negative power source.

Figure 3:
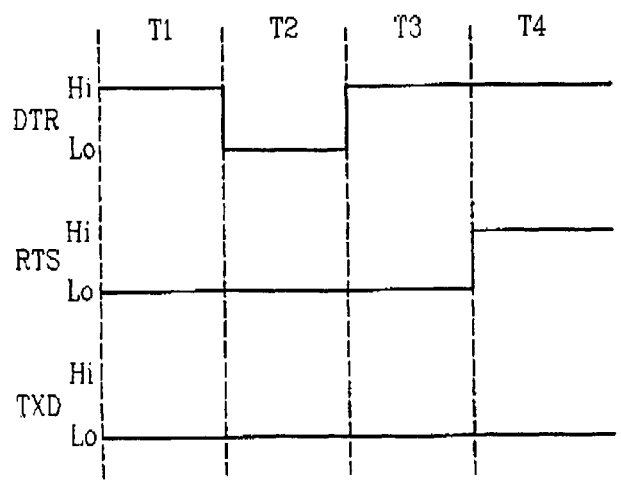
FIG. 3 is a schematic diagram of states of DTR, RTS, and TXD during the enumeration process.

FIG. 3 shows timings of the signal level of DTR, RTS, and TXD during the enumeration process. The timings during the enumeration process are described as below.

1. In T1 duration, voltage levels of all pins are set at initialization voltage levels by the enumerator software. The RTS and TXD are at negative signal level and DTR is held at positive signal level for waiting for a response of DSR from a PnP device. The duration is about 200 ms (±35 ms) and so the PnP device must respond within 200 ms. In the present invention, due to the DSR being coupled to DTR (e.g.: DTR is short to DSR or the micro controller 1 detects the DTR signal and responses to DSR), DSR responds to the DTR forever. When the computer receives the response of the DSR and then goes into COM port setup.
2. In T2 duration, voltage levels of DTR, RTS, and TXD are set at negative signal level for going into COM port setup. The duration is about 200 ms (±35 ms).
3. In T3 duration, voltage levels of RTS and TXD are set at negative signal level, and voltage level of DTR is set at positive signal level for ending COM port setup. The duration is about 200 ms (±35 ms).
4. In T4 duration, voltage level of TXD is set at negative signal level, and voltage levels of RTS and DTR are set at positive signal level for waiting for PnP ID information that is transmitted through RXD (Pin2) at 1200 bit/s by asynchronous transmission mode.
5. If the enumerator software checks that the received information is a valid PnP ID information, the setup service of new device starts.

For a PnP device, two important steps during the enumeration process are: (1). DTR is at positive signal level during T1 duration, DTR is as a PnP detecting signal and DSR must respond to the detection of DTR within 200 ms. DSR is coupled to DTR in the present invention and so DSR can immediately respond to DTR detection; and (2). RTS is at positive signal level during T4 duration, the micro controller 1 simulates asynchronous transmission mode, and reports device PnP ID at 1200 bit/s through GPIO, or the micro controller 1 may report device PnP ID at 1200 bit/s through UART (universal asynchronous receiver transmitter) or USART (universal synchronous/asynchronous receiver transmitter). RTS being at positive signal level is as a trigger signal for starting to report PnP ID. Hence, during T4 duration, the micro controller in the UPS receives the trigger signal and then reports the device PnP ID to the computer.

Moreover, the micro controller 1 detects whether DTR is at positive signal level as a trigger signal to replace with detecting whether RTS is at positive signal level. The positive signal level of RTS is as the reference positive power of the signal voltage level transfer 3 and the negative signal level of TXD is as the reference negative power thereof. Therefore, during T1 and T3 duration, RTS is at negative signal level, the signal voltage level 3 can not work and so DTR signal can not be transmitted to the micro controller 1. However, during T4 duration, RTS and DTR are at positive signal level and TXD is at negative signal level and so the signal voltage level transfer 3 transfers the positive signal level of DTR of signals 4, 5 into the micro controller level of signals 2. Therefore, the micro controller 1 can receive the trigger signal at suitable time and then reports PnP ID information to the computer. Hence, the present invention can employ detecting whether DTR is at positive signal level as a trigger signal to replace with detecting whether RTS is at positive signal level.

The states and commands of the UPS can be reported through CTS, CD, and DTR by simple signaling. It is described as below:

1. Power Cut: when the UPS detects the abnormal electric power, such as too high, too low, the frequency thereof is out of range, and then switch the output power is provided by battery power. At this time, the UPS transmits a simple signal to CTS for warning that the UPS goes into battery back-up mode.
2. Low Battery: when the output power is provided by the battery power, if the remaining battery capacity is under a predetermined level, the voltage of the battery is too low, or the operating time in the battery back-up mode exceeds predetermined time, the UPS transmits a simple signal to CD for warning that the UPS will goes into shutdown.
3. On Battery Remote Shutdown: when the output power comes from the electric power of the battery, users can setup to save data and proceed a shutdown process after a certain time (adjustable/constant) by application software. The UPS received the shutdown signal from the computer, delays a predetermined time (saving in memory of the UPS), and turns off the supply of the electric power.

Hence, if detecting RTS is as the trigger signal for starting to report PnP ID information, 5 pins are coupled to the micro controller in the present invention. The 5 pins are respectively Pin8 (CTS), Pin4 (DTR), Pin1 (CD), Pin7 (RTS), and Pin2 (RXD). The simple signals are transmitted to the computer through CTS and CD for reporting the state of the UPS; the DTR signal is transmitted from the computer to UPS for receiving a sample signal of On Battery Remote Shutdown. The RTS is employed to detect whether the computer is waiting for PnP ID information. The RXD is employed to transmit PnP ID information to the computer.

If detecting DTR is as a signal for starting to report PnP ID information, 4 pins are coupled to the micro controller in the present invention. The 4 pins are respectively Pin8 (CTS), Pin4 (DTR), Pin1 (CD), and Pin2 (RXD). Due to only when RTS is at the positive signal level and TXD is at the negative signal level, DTR can be transmitted to the micro controller 1 through the signal voltage level transfer 3. Therefor, DTR can be as a PnP ID trigger signal during the enumeration process. During the enumeration process, the DTR is as a trigger signal of PnP ID; and during the UPS monitoring process, the DTR is employed to transmit a signal of On Battery Remote Shutdown from the host computer to the UPS. Therefore, the DTR is simultaneously employed by micro controller to be a PnP ID trigger signal and to be a On Battery Shutdown signal from computer. The time length of holding at positive signal level in DTR can be employed to determine that DTR is under enumeration process or the monitoring process. During the enumeration, the time length of holding at positive signal level in DTR is shorter, and during the UPS monitoring process, the holding is longer. Hence, the state of enumeration process or the monitoring process can be determined according to the time length of holding at positive signal level in DTR. The micro controller 1 may receive a DTR signal and assume that it is a PnP trigger signal, and then report PnP ID to the computer. During the this process, the micro controller 1 detects the DTR signal all the time until the DTR signal come back negative signal level. Then, the micro controller 1 determines that DTR is under enumeration process or the monitoring process according to the time length of that DTR signal holding at positive signal level. Hence, when the computer transmits a signal of On Battery Remote Shutdown, the UPS still report PnP ID information that is trivial for the computer and so this does not effect actual operation. Accordingly, the present invention can achieve the PnP function by coupling 4 pins or more to the micro controller 1.

The present invention can be employed to any type of UPS, e.g.: on-line, off-line and line interactive UPS. Therefore, the serial port PnP function and simple signaling communication in UPS can be integrated into simple signaling communication type UPS.

As aforementioned, the present invention provides a simple signaling communication type UPS having serial port PnP function. The UPS comprises an UPS means, a transferring means, and a serial port. The UPS means comprises a micro controller. The transferring means transfers a voltage level of a first micro controller signal into a voltage level of a first serial port signal and transfers a voltage level of a second serial port signal into a voltage level of a second micro controller signal. The serial port a DTR pin, a DSR pin, and a RTS pin, wherein the DSR pin is coupling to the DTR pin to generate a response signal for responding a detecting signal of the DTR pin. Wherein, during a PnP enumeration process, the micro controller transmits a PnP ID information after a voltage level of the RTS pin is transferred from a negative signal level to a positive signal level. The positive signal level of RTS or DTR is as a trigger signal, the micro controller receives the trigger signal and then generates a PnP ID information.

Hence, compared with that in the conventional arts, the PnP ID can not be transmitted to a computer through a serial port with a simple signaling of dry-contact. The present invention integrates serial port plug and play into simple signaling communication type UPS, and simulates the asynchronous serial data transmission of the RS-232 serial port for transmitting a PnP ID to a computer. Therefore, the operating system can identify the UPS and guide users to install a suitable driver or application software.

Although specific embodiments have been illustrated and described, it will be obvious to those skilled in the art that various modifications may be made without departing from what is intended to be limited solely by the appended claims.

What is claimed is:

1. A simple signaling communication type UPS having serial port PnP function, said UPS comprising:
   a UPS means, said UPS means comprising:
      a micro controller;
      a transferring means transferring a voltage level of a first micro controller signal into a voltage level of a first serial port signal and transferring a voltage level of a second serial port signal into a voltage level of a second micro controller signal; and a serial port transmitting said first serial port signal and said second serial port signal between said UPS means and a system, said serial port comprising:
   a DTR pin transmitting said second serial port from said system to said UPS means;
   a DSR pin coupling to said DTR pin to generate a response signal for responding a detecting signal of said DTR pin;
   a RTS pin, wherein during a PnP enumeration process, said micro controller transmits a PnP ID information after a voltage level of said RTS pin is transferred from a negative signal level to a positive signal level.

2. The UPS in claim 1, wherein said transferring means employs said positive signal level of said RTS pin as a reference positive power.

3. The UPS in claim 1, wherein said serial port further comprises a TXD pin that is at negative signal level during said PnP enumeration process.

4. The UPS in claim 3, wherein said transferring means employs said negative signal level of said TXD pin as a reference negative power.

5. The UPS in claim 4, wherein when said RTS pin is at a positive signal level, said transferring means transfers a signal of said DTR pin into a trigger signal to said micro controller, said micro controller receives said trigger signal and then start to transmit said PnP ID information.

6. The UPS in claim 5, wherein a time difference between a time point of said micro controller starting to transmit said PnP ID information and a time point of said RTS pin starting to be at positive signal level is shorter than 200 ms.

7. The UPS in claim 5, wherein said serial port further comprises a RXD pin that said PnP ID information is transmitted to said system through said RXD pin by an asynchronous serial data transmission.

8. The UPS in claim 1, wherein said RTS pin being at a positive signal level is as a trigger signal, said micro controller receives said trigger signal and then start to transmit said PnP ID information.

9. The UPS in claim 8, wherein a time difference between a time point of said micro controller starting to transmit said PnP ID information and a time point of said RTS pin starting to be at positive signal level is shorter than 200 ms.

10. The UPS in claim 8, wherein said serial port further comprises a RXD pin that said PnP ID information is transmitted to said system through said RXD pin by an asynchronous serial data transmission.

11. A simple signaling communication type UPS having serial port PnP function, said UPS comprising:
   a battery;
   a charger receiving an input AC power and charging said battery;
   an inverter transferring an electric power of said battery into an output AC power;
   a micro controller generating command signals according to detecting a state of said input AC power and a state of said battery;
   a transferring means transferring a voltage level of a first micro controller signal into a voltage level of a first serial port signal and transferring a voltage level of a second serial port signal into a voltage level of a second micro controller signal; and
   a serial port transmitting said first serial port signal and said second serial port signal between said UPS and a system, said serial port comprising:
      a DTR pin transmitting said second serial port from said system to said UPS;
      a DSR pin coupling to said DTR pin to generate a response signal for responding a detecting signal of said DTR pin;
      a RTS pin,
   wherein during a PnP enumeration process, said micro controller transmits a PnP ID information after a voltage level of said RTS pin is transferred from a negative signal level to a positive signal level.

12. The UPS in claim 11, wherein said transferring means employs said positive signal level of said RTS pin as a reference positive power.

13. The UPS in claim 11, wherein said serial port further comprises a TXD pin that is at negative signal level during said PnP enumeration process.

14. The UPS in claim 13, wherein said transferring means employs said negative signal level of said TXD pin as a reference negative power.

15. The UPS in claim 14, wherein when said RTS pin is at a positive signal level, said transferring means transfers a signal of said DTR pin into a trigger signal to said micro controller, said micro controller receives said transmitting signal and then start to transmit said PnP ID information.

16. The UPS in claim 15, wherein a time difference between a time point of said micro controller starting to transmit said PnP ID information and a time point of said RTS pin starting to be at positive signal level is shorter than 200 ms.

17. The UPS in claim 15, wherein said serial port further comprises a RXD pin that said PnP ID information is transmitted to said system through said RXD pin by an asynchronous serial data transmission.

18. The UPS in claim 11, wherein said RTS pin being at a positive signal level is as a trigger signal, said micro controller receives said trigger signal and then start to transmit said PnP ID information.

19. The UPS in claim 18, wherein a time difference between a time point of said micro controller starting to transmit said PnP ID information and a time point of said RTS pin starting to be at positive signal level is shorter than 200 ms.

20. The UPS in claim 18, wherein said serial port further comprises a RXD pin that said PnP ID information is transmitted to said system through said RXD pin by an asynchronous serial data transmission.

\* \* \* \* \*